(12) United States Patent
Hoemann

(10) Patent No.: US 7,474,074 B2
(45) Date of Patent: Jan. 6, 2009

(54) VARIABLE SPEED INDUCTION MOTOR WITH WYE-DELTA SWITCHING WITH REDUCED DRIVE VOLT-AMP REQUIREMENT

(75) Inventor: Keith I. Hoemann, Fenton, MO (US)

(73) Assignee: Emerson Electric Co., St. Louis, MO (US)

( * ) Notice: Subject to any disclaimer, the term of this patent is extended or adjusted under 35 U.S.C. 154(b) by 83 days.

(21) Appl. No.: 11/560,779

(22) Filed: Nov. 16, 2006

(65) Prior Publication Data

US 2008/0116839 A1 May 22, 2008

(51) Int. Cl.
*H02P 1/26* (2006.01)

(52) U.S. Cl. .................. 318/772; 317/771; 317/727; 317/825

(58) Field of Classification Search .......... 318/727, 318/771, 780, 801, 825, 772
See application file for complete search history.

(56) References Cited

U.S. PATENT DOCUMENTS

| | | | | |
|---|---|---|---|---|
| 3,474,646 A | * | 10/1969 | Sims et al. | 68/12.01 |
| 5,070,291 A | * | 12/1991 | Nakamura et al. | 318/77 |
| 5,333,474 A | * | 8/1994 | Imai et al. | 68/12.16 |
| 6,275,405 B1 | * | 8/2001 | Pernyeszi | 363/154 |
| 6,442,979 B1 | * | 9/2002 | Thorn et al. | 68/12.16 |
| 6,493,924 B2 | | 12/2002 | Das | |
| 7,000,436 B2 | * | 2/2006 | Peterson | 68/12.04 |
| 7,047,770 B2 | * | 5/2006 | Broker et al. | 68/12.16 |
| 7,372,233 B2 | * | 5/2008 | Albayrak et al. | 318/812 |
| 2002/0101122 A1 | | 8/2002 | Haines et al. | |
| 2005/0155159 A1 | * | 7/2005 | Peterson | 8/158 |

\* cited by examiner

*Primary Examiner*—Bentsu Ro
*Assistant Examiner*—Thai Dinh
(74) *Attorney, Agent, or Firm*—Senniger Powers LLP

(57) ABSTRACT

A washing machine comprising a laundry receptacle, a variable speed induction motor driving the laundry receptacle at a wash speed and as spin speed, a drive for powering the motor, and a wye-delta switch for connecting the drive and the motor in a wye configuration during the wash cycle or a delta configuration during a spin cycle. A controller controls the speed of the motor and the switch.

14 Claims, 9 Drawing Sheets

VARIABLE SPEED INDUCTION MOTOR WITH WYE-DELTA SWITCHING WITH REDUCED DRIVE VOLT-AMP REQUIREMENT

FIELD OF THE INVENTION

The present invention generally relates to variable speed induction motors and, in particular, a variable speed induction motor for driving the wash and spin cycles of a washing machine.

BACKGROUND OF THE INVENTION

High performance washing machines use variable speed motors, such as induction motors, that are required to operate over a wide speed range of approximately 30 to 1. During the wash cycle, the motor operates at a low speed typically in the range of 400-800 rpms with high torque. During the spin cycle, the motor operates at a high speed, typically in the range of 12,000-18,000 rpms with low torque. In order to deliver the necessary torque and speed, the motor has its windings in a delta (Δ) configuration. This results in a motor which has operating parameters requiring high currents and low voltage during wash cycles, while having lower currents and higher voltage during spin cycles. Such operating parameters result in requiring a motor drive circuit with a large volt-amp or horsepower capability.

Flux weakening techniques and tapped windings have been used to reduce the volt-amp requirement of the motor drive circuit. Such techniques and windings have an impact on the manufacturing costs and the output performance characteristics of the motor.

SUMMARY OF THE INVENTION

In one embodiment, a variable speed induction motor has a drive for powering the motor, a wye-delta switch for connecting the drive and the motor in either a wye configuration or a delta configuration, and a controller controlling the speed of the motor and controlling the switch. The controller controls the switch so that the drive is connected to the motor in a wye configuration at a first speed. The controller controls the switch so that the drive is connected to the motor in a delta configuration at a second speed greater than the first speed.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
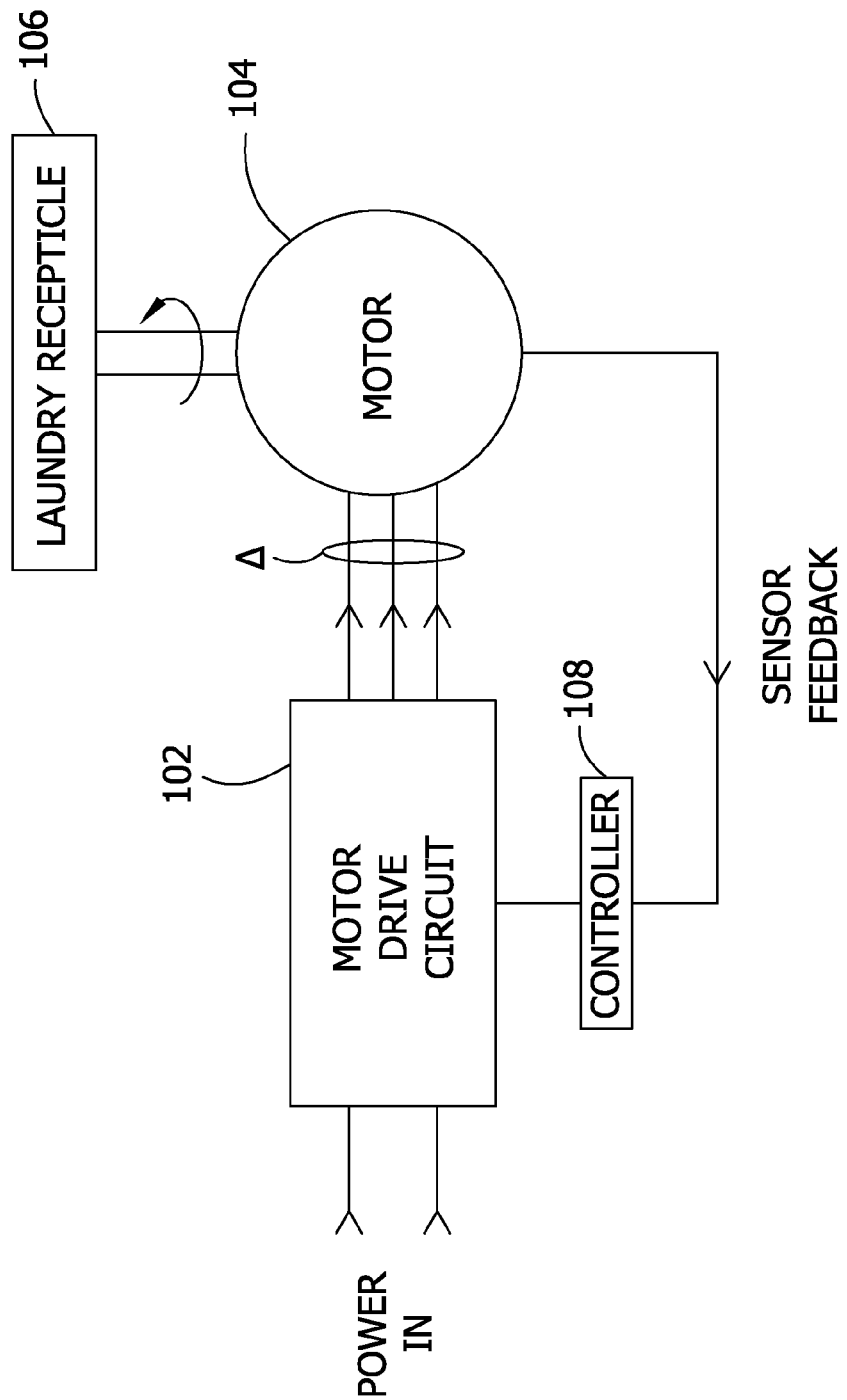
FIG. 1 illustrates a block diagram of a motor and drive of the prior art.

FIG. 1 illustrates a typical variable speed induction motor and control. Input power is applied via a motor drive circuit 102 (e.g., an inverter or commutation circuit) to windings of a motor 104 driving a laundry receptacle 106. The motor drive circuit 102 is connected to the windings of the motor 104 in a delta (Δ) configuration. A sensor (such as Hall sensor or other position sensor or back emf sensor, not shown) provides feedback information to a controller 108 which controls the motor drive circuit 102 to selectively energize the windings of the motor 104.

A given motor design will require a fixed V-A (volt-amp) requirement for the motor drive circuit 102 in order to handle the current and voltage needed to achieve a specific range of speeds and torques. Many variable speed motors, such as variable speed motors for a washing machine, require characteristics to include two different conditions: (1) high torque at low speed such as for a wash cycle and (2) lower torque at higher speed such as for a spin cycle. These two different conditions result in the motor drive circuit V-A (volt-amp) requirement which is typically larger than the motor drive circuit V-A (volt-amp) requirement that either condition alone requires.

Figure 2:
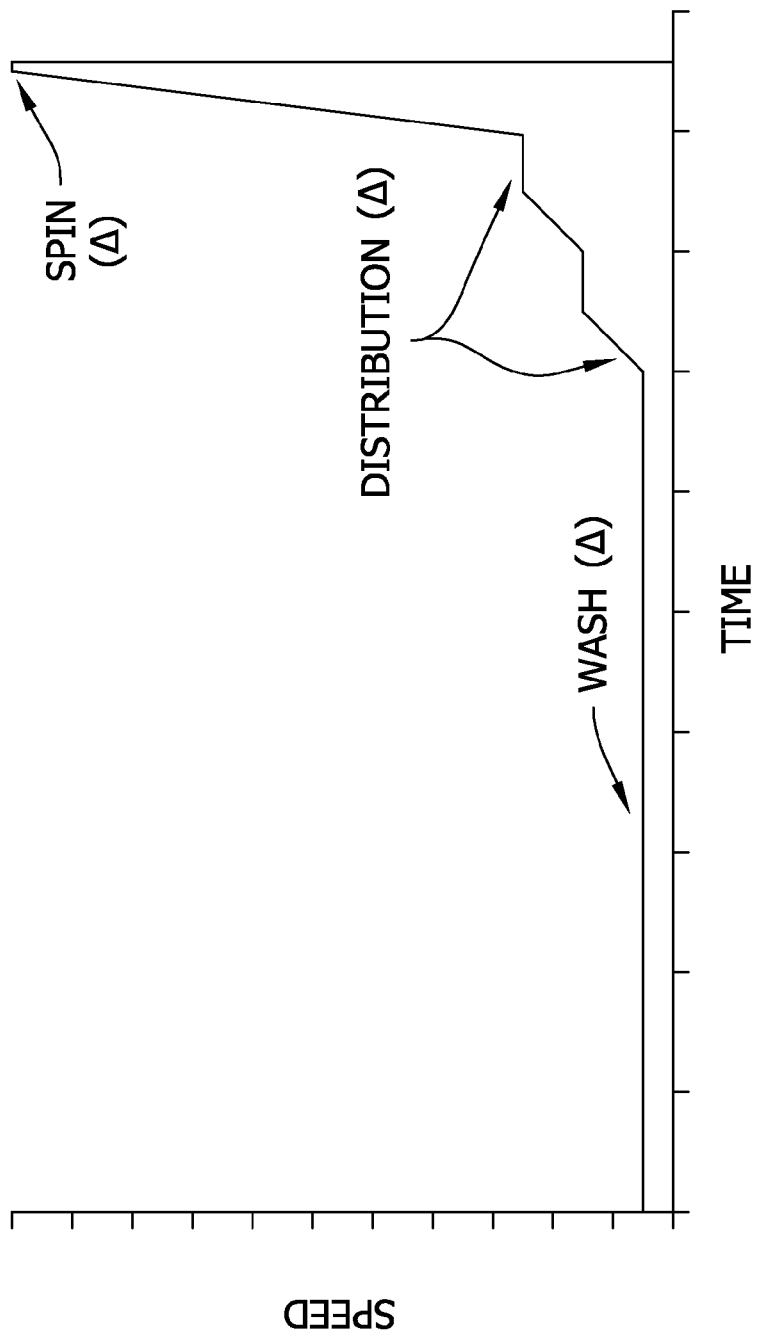
FIG. 2 illustrates a typical speed vs. time profile of the motor and drive illustrated in FIG. 1, of the prior art.
Figure 3:
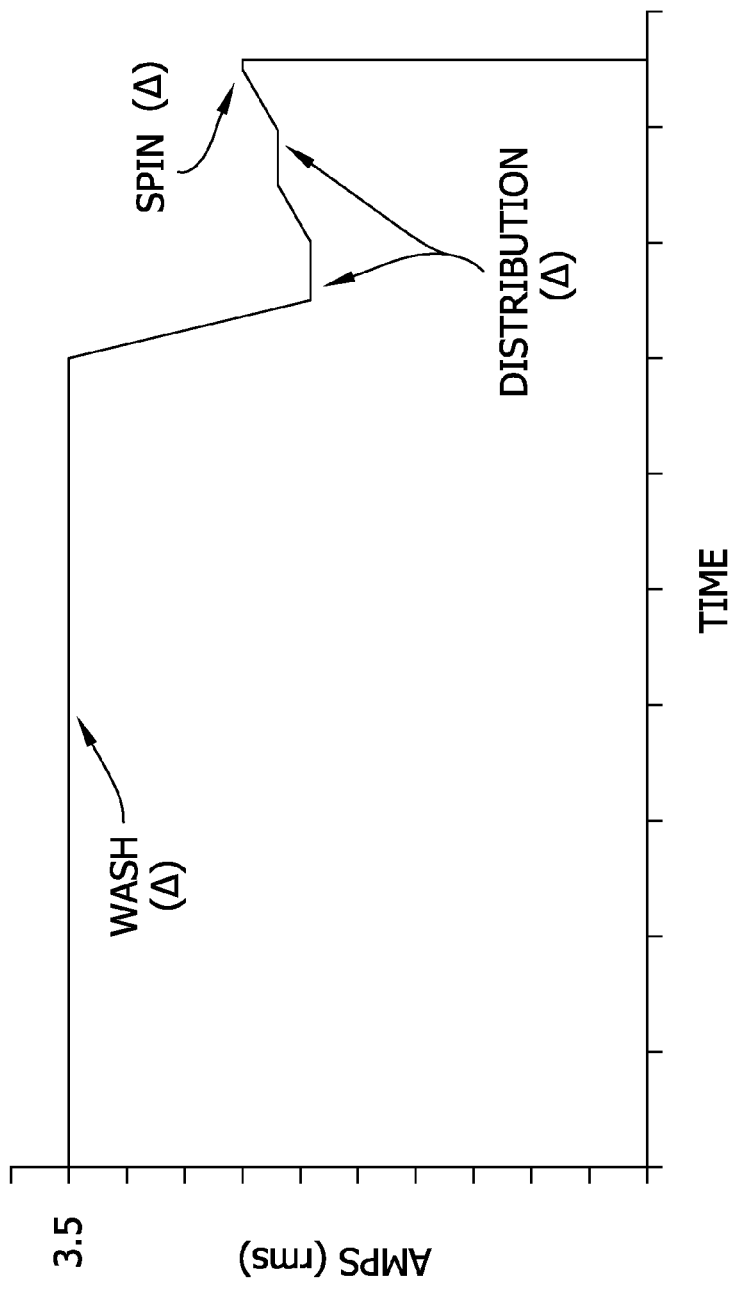
FIG. 3 illustrates a typical current (rms amps) vs. time profile of the motor and drive illustrated in FIG. 1, of the prior art.

For example, as shown in FIGS. 2 and 3 as an exemplary embodiment, a typical series of cycles for the motor 104 would include a low speed (e.g., low voltage), high current (e.g., high torque) wash cycle, such as an agitation cycle. The wash cycle transitions with increasing speed and decreasing current into a distribution cycle, such as a drain cycle. The distribution cycle transitions into a higher speed (e.g., higher voltage), lower current (e.g., lower torque) spin cycle, such as a cycle which spins the laundry receptacle 106.

Figure 4:
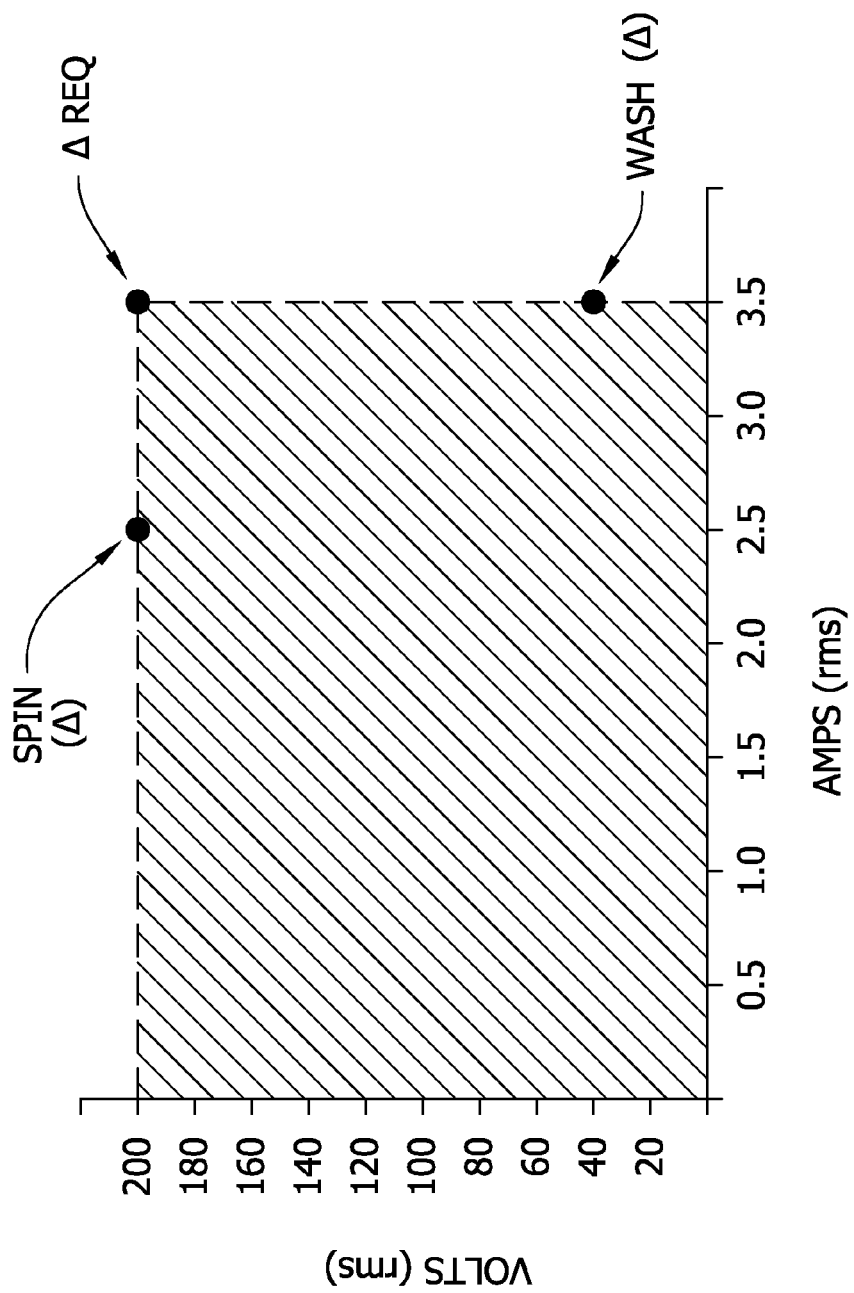
FIG. 4 illustrates typical volt-amp requirement of the motor and drive illustrated in FIG. 1, of the prior art.

As shown in FIG. 4 in an exemplary embodiment, the wash cycle requires high current (3.5 amps) and low voltage (40 volts) so that the motor drive circuit 102 would have a V-A (volt-amp) requirement of 140 volt-amps during the wash cycle. On the other hand, the spin cycle requires lower current (2.5 amps) and substantially higher voltage (200 volts) so that the motor drive circuit 102 would have a V-A requirement of 500 volt-amps during the spin cycle. As a result, the motor drive 102 would have a V-A requirement of 700 volt-amps (Δ REQ, 3.5 amps, 200 volts) in order to able to operate in both the wash and spin cycles without being subjected to current or voltage overloads.

Figure 5:
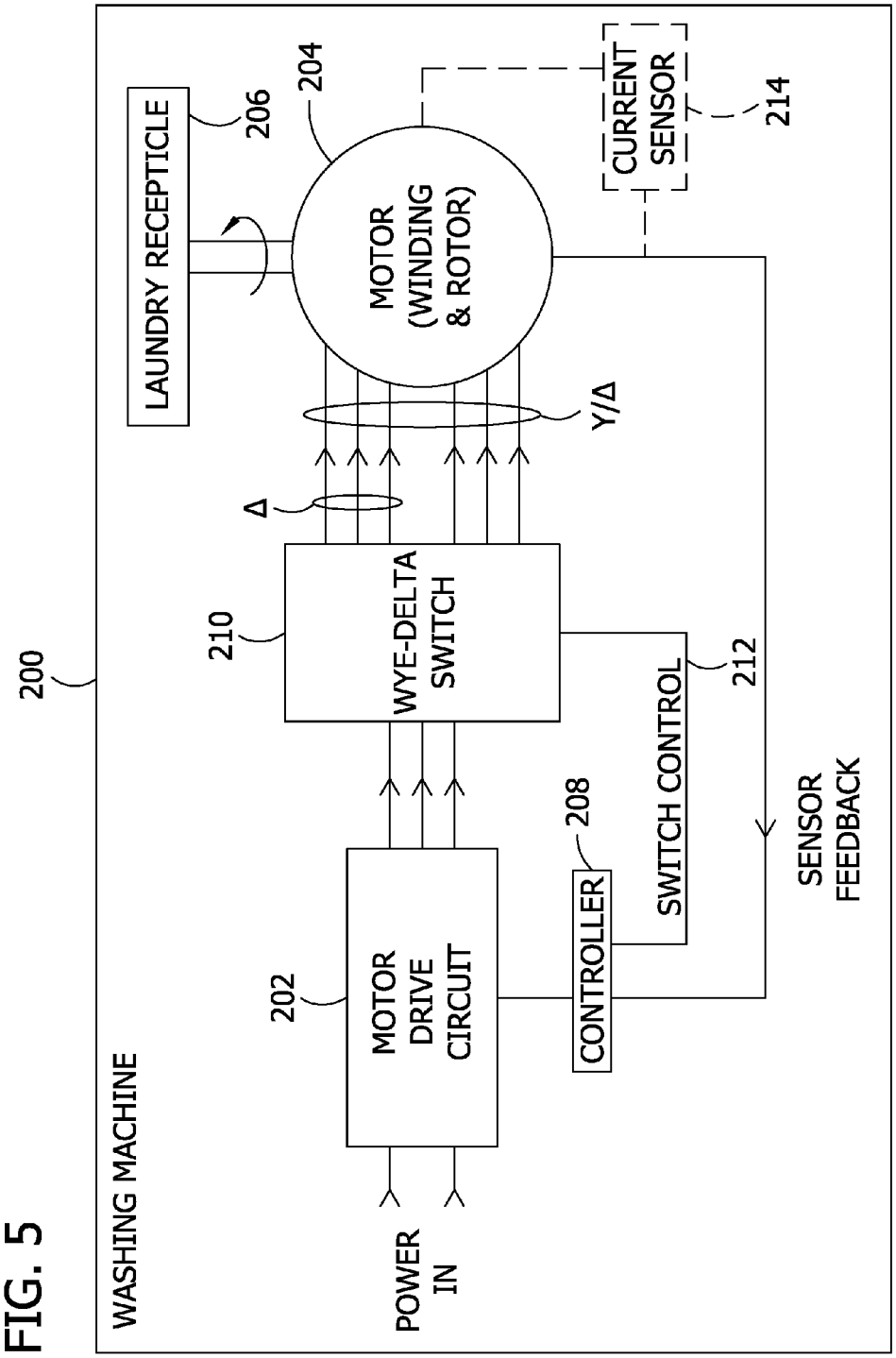
FIG. 5 illustrates a block diagram of a motor and drive of one embodiment of the invention.

FIG. 5 illustrates a washing machine 200, such as a horizontal axis or vertical axis washing machine, either with a direct drive or a belt drive for operating a laundry receptacle, the drive driven by a variable speed induction motor and control, according to one embodiment of the invention. Input power is applied via a motor drive circuit 202 (e.g., an inverter or commutation circuit) for application to windings of an induction motor 204 driving a laundry receptacle 206. A sensor (such as Hall sensor or other position sensor or back emf sensor, not shown) provides feedback information to a controller 208 which controls the motor drive circuit 202 to selectively energize the windings of the motor 204. The motor drive circuit 202 is connected to the windings of the motor 204 via a wye-delta switch 210 which energizes the windings in either a wye (Y) configuration or in a delta (Δ) configuration, depending on the position or mode of the switch 210 as controlled by the controller 208 via a switch control 212. In one embodiment, the controller 208 controls switch 210 to apply power to the windings of the motor 204 in a wye (Y) configuration during a wash cycle of the washing machine 200. In addition, the controller 208 controls switch 210 to apply power to the windings of the motor 204 in a delta (Δ) configuration during a spin cycle of the washing machine 200.

Figure 6:
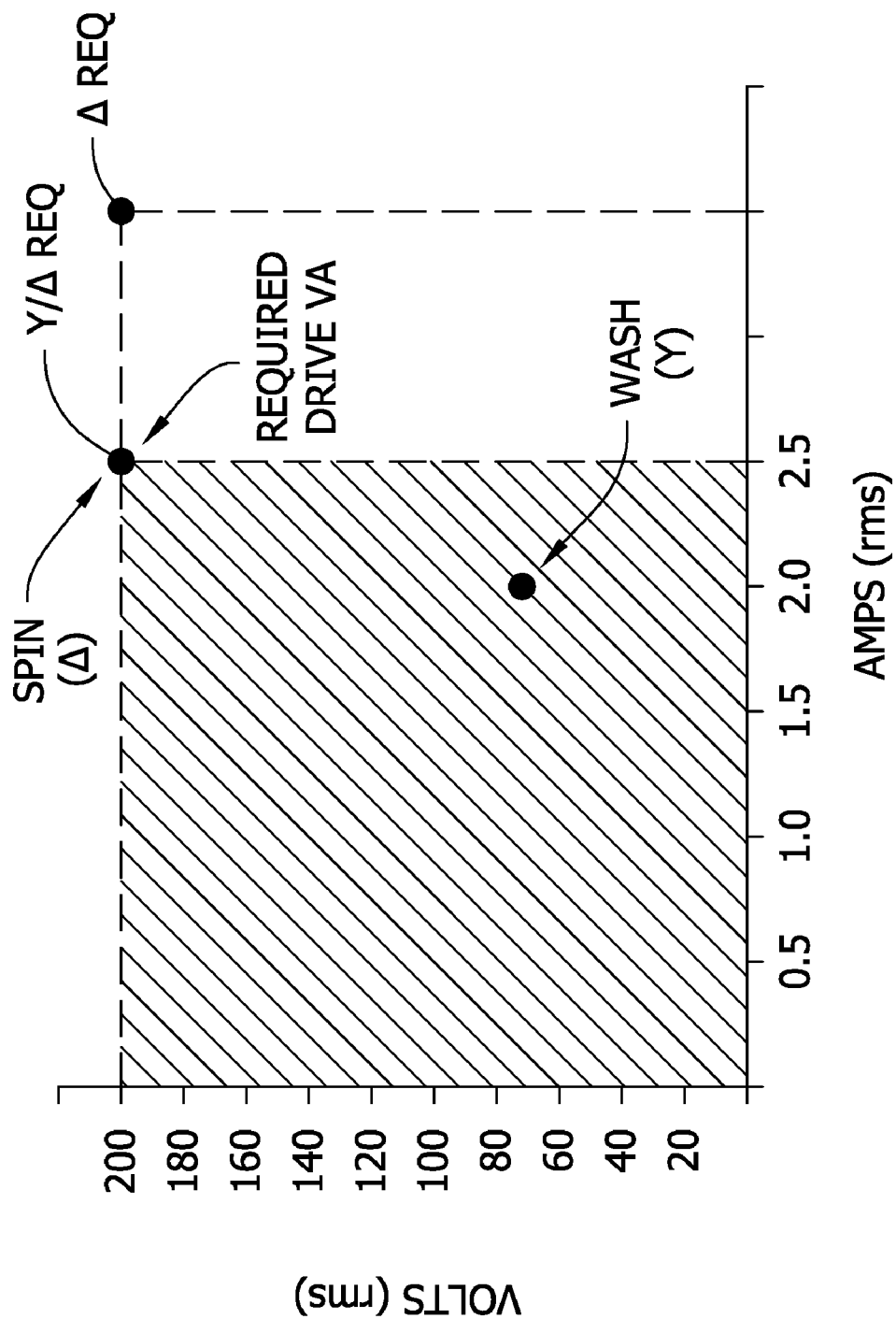
FIG. 6 illustrates the volt-amp requirement of the motor and drive illustrated in FIG. 5, of the invention.
Figure 7:
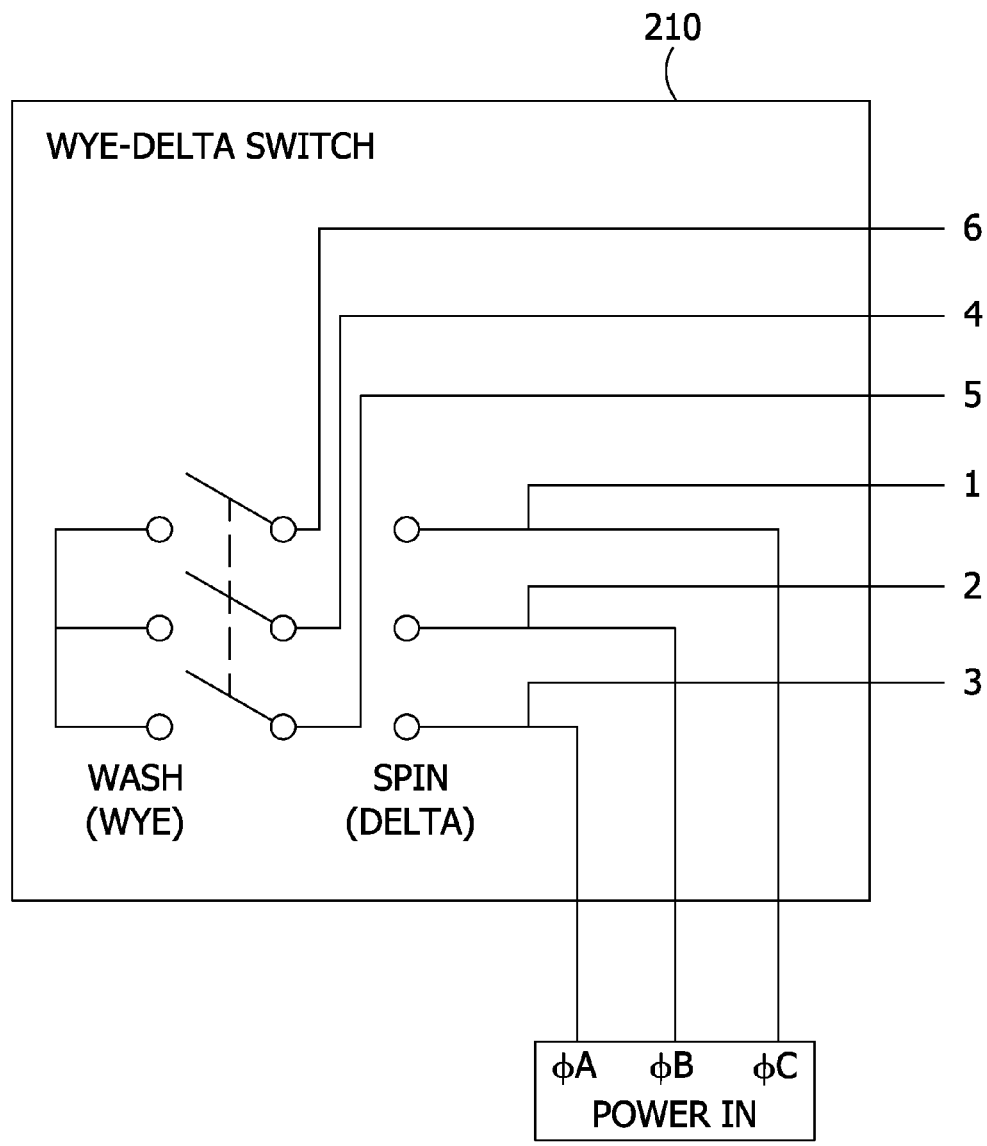
FIG. 7 is a schematic diagram of a wye-delta switch of FIG. 5 of one embodiment of the invention.

For example, as shown in FIGS. 6 and 7 as an exemplary embodiment, a series of cycles for the motor 204 would include a low speed (e.g., low voltage), high current (e.g., high torque) wash cycle, such as an agitation cycle. The wash cycle transitions with increasing speed and decreasing current into a distribution cycle, such as a drain cycle. The distribution cycle transitions into a higher speed (e.g., higher voltage), higher current (e.g., higher torque) spin cycle, such as a cycle which spins the laundry receptacle 206. In one embodiment, the wash speed of the motor 204 is in the range of 400-800 rpms at a first torque/current range and the spin speed is in the range of 12,000-18,000 rpms at a second torque/current range greater than the first torque range. Thus, a ratio of the spin speed to the wash speed is at least 15:1 and usually the ratio is about 30:1.

As shown in FIG. 6 as an exemplary embodiment, the wash cycle requires high current (e.g., 2.0 amps) and moderate voltage (e.g., 75 volts) so that the motor drive circuit 202 would have a lower V-A (volt-amp) requirement (e.g., 150 volt-amps) during the wash cycle. On the other hand, the spin cycle requires somewhat higher current (e.g., 2.5 amps) and higher voltage (e.g., 200 volts) so that the motor drive circuit 102 would have a somewhat higher V-A requirement (e.g., 500 volt-amps) during the spin cycle. As a result, the motor drive 202 would have a moderate V-A requirement in order to able to operate in the wash cycle in the wye (Y) configuration and in the spin cycle in the delta (Δ) configuration without being subjected to current or voltage overloads. This moderate V-A requirement would be less than the V-A requirement for the motor drive 202 in order to able to operate in the wash cycle in the delta (Δ) configuration and in the spin cycle in the delta (Δ) configuration without being subjected to current or voltage overloads. For example, the motor drive 202 would have a V-A requirement of 500 volt-amps (Y/Δ REQ, e.g., 2.5 amps, 200 volts) in order to able to operate in the wash cycle in the wye (Y) configuration and in the spin cycle in the delta (Δ) configuration without being subjected to current or voltage overloads. The compares to a Δ REQ of 700 volt-amps, according to the prior art. The magnitudes of current and voltage shown in FIG. 6 are illustrative and exemplary and not intended to limit the scope of the invention.

Figure 8:
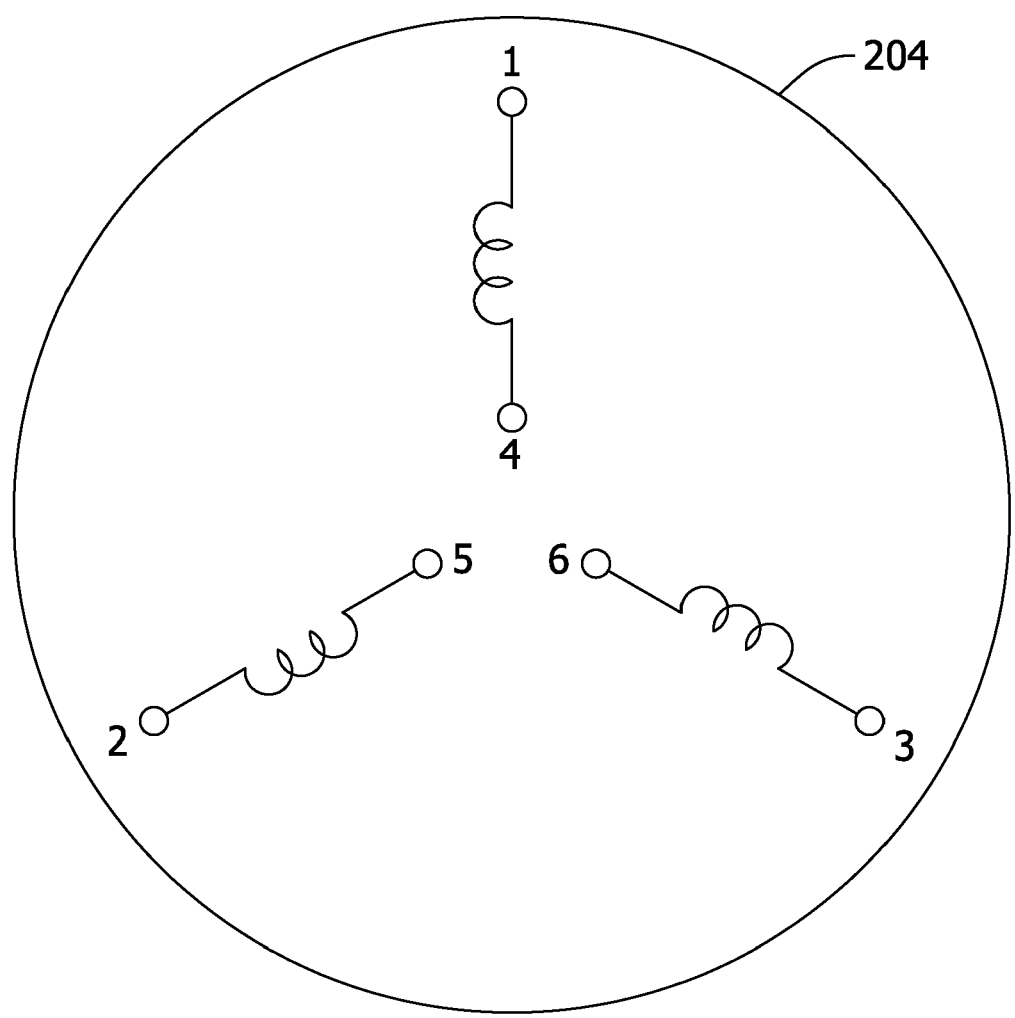
FIG. 8 is a schematic diagram of the windings of a motor for connection to wye-delta switch of FIG. 5 so that the windings are connected to a motor drive circuit in either a wye or a delta configuration, according to one embodiment of the invention.
Figure 9:
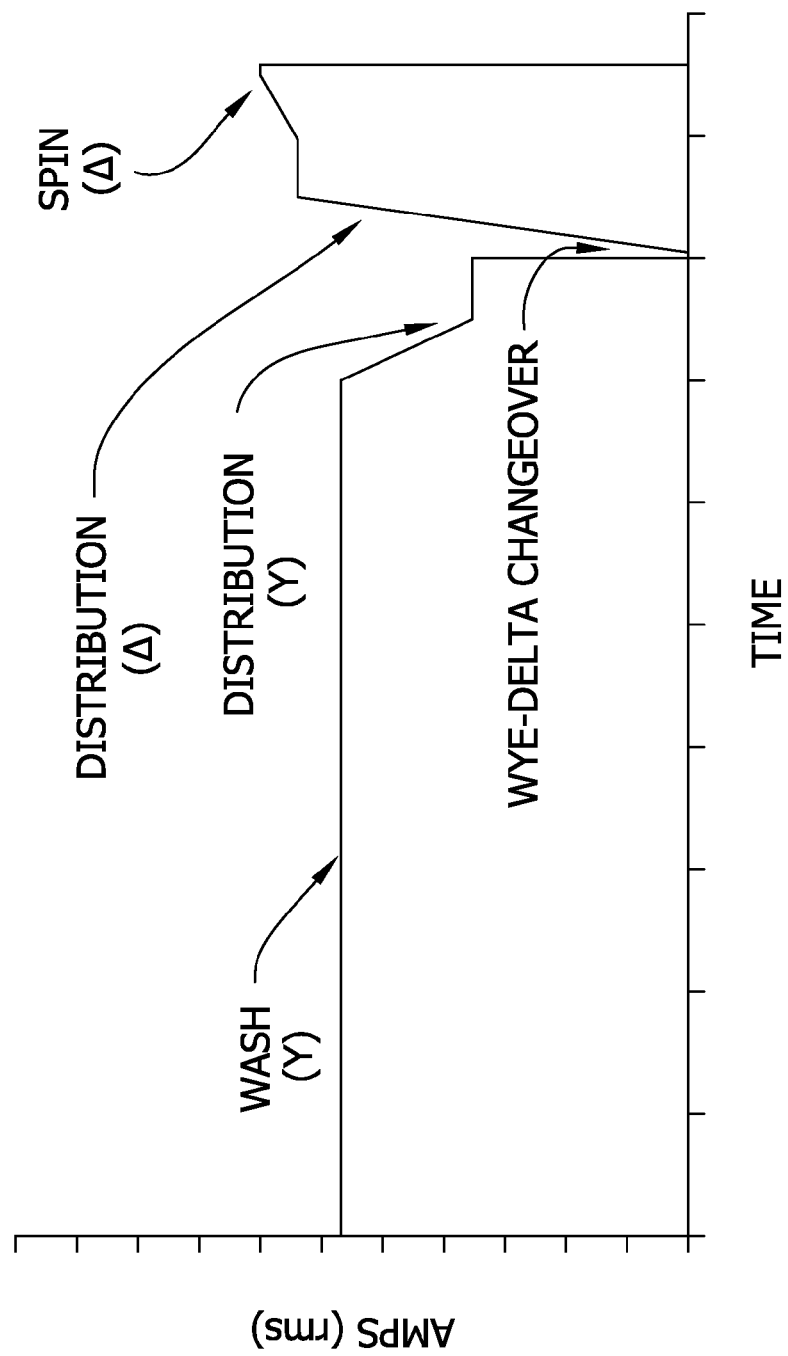
FIG. 9 illustrates a current (rms amps) vs. time profile of one embodiment of the invention of the motor and drive illustrated in FIG. 5.

In one embodiment, wye-delta switch 210 may be a triple pole, double throw (3PDT) switch (electronic or mechanical) as illustrated in FIG. 7. FIG. 8 illustrates one embodiment of motor 204 which would be connected to the wye-delta switch 210 shown in FIG. 7. The controller 204 controls the switch 210 to energize the motor in the wye (Y) configuration for the wash cycle. As the motor transitions into distribution, the motor 204 is employed to spin a drum of the laundry receptacle. Clothes in the drum are plastered to the side of the drum as it spins and the torque need begins to drops substantially. During this distribution cycle, a wye-delta changeover as shown in FIG. 9 is implemented by the controller 208. In particular, it is contemplated that switch 210 has three modes or positions: a first position in which the motor drive circuit 202 is connected to the windings of the motor 204 in a wye (Y) configuration, a second position in which the motor drive circuit 202 is disconnected from the windings of the motor 204 so that the motor windings are open-circuited, and a third position in which the motor drive circuit 202 is connected to the windings of the motor 204 in a delta (Δ) configuration.

The controller 208 places the switch 210 in the wye configuration during the wash cycle and the first part of the distribution cycle. The controller 208 places the switch 210 in the second position to open circuit the windings of the motor 204 so that power to the windings are shut off for a period of time. This period of time may be a preset period of time (e.g., 10-200 ms). Alternatively, the period of time may be a function of the status of the motor. For example, the controller 208 may monitor motor current via an optional current sensor 214 and maintain the switch 210 in the second position until the motor current decays to a preset, nominal or zero current. The controller 208 then controls the switch 210 to energize the motor 204 in the delta (Δ) configuration for the spin cycle. The inertia of the drum will keep the drum spinning during the wye-delta changeover during which the motor 204 is not energized so that when the power is again applied to the motor, the current is still low. As a result, the life of the switch 20 is extended because the line current (e.g., 110 volts) that would cause the contacts of the switch 210 to wear is reduced or eliminated during opening and closing of the contacts. It is also contemplated that a similar changeover may be implemented if switching from a delta configuration to a wye configuration. The controller 208 places the switch 210 in the delta configuration during the second part of the distribution cycle, after the changeover, and during the spin cycle.

Thus, the controller 208 discontinues for a period of time the output of the drive circuit 202 to the motor 204 when the controller 208 switches the switch 210 from a wye configuration to a delta configuration or visa versa. That is, the controller 208 may discontinue for a period of time the output of the drive circuit 202 to the motor 204 when the controller 208 switches the switch 210 from a delta configuration to a wye configuration.

Comparing FIG. 4 and FIG. 6 illustrates one embodiment of the invention. For example, the comparison indicates that the current requirement of the motor 204 at the wash speed with a wye configuration as shown in FIG. 6 is less than the current requirement of the motor 104 at the wash speed with a delta configuration as shown in FIG. 4. Also, the comparison indicates that the voltage requirement of the motor 204 at the wash speed with a wye configuration as shown in FIG. 6 is greater than the voltage requirement of the motor 104 at the wash speed with a delta configuration as shown in FIG. 4. Also, the comparison indicates that the volt-amp requirement (Y/Δ REQ) of the drive circuit 202 at the wash speed with a wye configuration and at the spin speed with a delta configuration as shown in FIG. 6 is less than the volt-amp requirement (Δ REQ) of the drive circuit 102 at the wash speed with a delta configuration and at the spin speed with the delta configuration as shown in FIG. 4.

Having described the invention in detail, it will be apparent that modifications and variations are possible without departing from the scope of the invention defined in the appended claims.

EXAMPLE

The following non-limiting example is provided to further illustrate the present invention.

For example, consider a typical three phase, variable speed, induction motor with a delta (Δ) winding configuration, similar to the motor illustrated in FIGS. 1-4. Such a motor would have a wash cycle (high torque, low speed) in which the motor drive circuit V-A (volt-amp) requirement is 140 volt-amps (3.5 A, 40V) in a delta (Δ) configuration. In addition, such a motor would also have a spin cycle (low torque, high speed) in which the motor drive circuit V-A requirement is 488 volt-amps (2.5 A, 195V) in a delta (Δ) configuration. This results in the motor drive circuit having a V-A requirement of 683 volt-amps (3.5 A, 195V).

According to one embodiment of the invention similar to the embodiment illustrated in FIGS. 5-9, operating the motor in a delta (Δ) configuration for the spin cycle and operating the motor in a wye (Y) configuration for wash cycle reduces the motor drive circuit V-A requirement to be less than 683 volt-amps. In particular, the motor drive circuit would have a V-A requirement of 150 volt-amps (2.0 A, 75V) for the wash cycle in a wye (Y) configuration. In addition, the motor drive circuit would have a V-A requirement of 488 volt-amps (2.5 A, 195V) for the spin cycle in a delta (Δ) configuration. This results in the motor drive circuit having a V-A requirement of 488 volt-amps (2.5 A, 195V). This reduces the motor drive circuit V-A requirement from 683 volt-amps to 488 volt-amps (i.e., by 29%) from the typical motor of FIGS. 1-4.

The magnitudes of current and voltage herein and included in the above examples and drawings are illustrative and exemplary and not intended to limit the scope of the invention.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

Although the invention has been described above in the context of a washing machine, those skilled in the art will recognize that the invention is generally applicable to induction motors in various applications.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A washing machine comprising:
   a laundry receptacle;
   a variable speed induction motor driving the laundry receptacle;
   a drive circuit for powering the motor;
   a wye-delta switch for connecting the drive circuit and the motor in either a wye configuration or a delta configuration; and
   a controller operating to control the speed of the motor and to control the switch configuration in a wash cycle and in a spin cycle wherein:
   (a) during the wash cycle, the controller controls the switch to connect drive circuit to the motor in the wye configuration and the controller controls the motor to drive the laundry receptacle at a wash speed, and
   (b) during the spin cycle, controller controls the switch to connect the drive circuit to the motor in the delta configuration and the controller controls the motor to drive the laundry receptacle at a spin speed greater than the wash speed.

2. The washing machine of claim 1 wherein a ratio of the spin speed to the wash speed is about 30:1 and wherein the wash speed is in the range of 400-800 rpms at a first torque range and wherein the spin speed is in the range of 12,000-18,000 rpms at a second torque range greater than the first torque range.

3. The washing machine of claim 1 wherein a current requirement of the motor at the wash speed with the wye configuration is less than a current requirement of the motor at the wash speed with the delta configuration.

4. The washing machine of claim 3 wherein a voltage requirement of the motor at the wash speed with the wye configuration is greater than a voltage requirement of the motor at the wash speed with the delta configuration.

5. The washing machine of claim 4 wherein a volt-amp requirement of the drive circuit at the wash speed with the wye configuration and at the spin speed with the delta configuration is less than a volt-amp requirement of the drive circuit at the wash speed with the delta configuration and at the spin speed with the delta configuration.

6. The washing machine of claim 1 wherein a voltage requirement of the motor at the wash speed with the wye configuration is greater than a voltage requirement of the motor at the wash speed with the delta configuration.

7. The washing machine of claim 6 wherein a volt-amp requirement of the drive circuit at the wash speed with the wye configuration and at the spin speed with the delta configuration is less than a volt-amp requirement of the drive circuit at the wash speed with the delta configuration and at the spin speed with the delta configuration.

8. The washing machine of claim 1 wherein the controller discontinues for a period of time the drive circuit output to the motor when the controller switches the switch from the wye configuration to the delta configuration or visa versa.

9. The washing machine of claim 8 wherein the switch has a first mode in which the drive circuit is connected to a windings of the motor in the wye (Y) configuration, a second mode in which the drive circuit is disconnected from the windings of the motor so that the motor windings are open-circuited, and a third mode in which the drive circuit is connected to the windings of the motor in the delta (Δ) configuration.

10. The washing machine of claim 1 wherein said motor has a current requirement, and wherein the current requirement of the motor is less than a current requirement for the motor connected to the drive circuit in the delta configuration during the wash cycle.

11. The washing machine of claim 1 wherein said drive circuit has a volt-amp requirement, wherein said motor has a current requirement, wherein the volt-amp requirement of the drive circuit is less than a volt-amp requirement for the drive circuit connected to the motor in the delta configuration during the wash cycle and wherein the current requirement of the motor is less than a current requirement for the motor connected to the drive circuit in the delta configuration during the wash cycle.

12. A washing machine comprising:
    a laundry receptacle;
    a variable speed induction motor driving the laundry receptacle;
    a drive circuit for powering the motor;
    a wye-delta switch for connecting the drive circuit and the motor in either a wye configuration or a delta configuration; and
    a controller operating to control the speed of the motor and to control the switch configuration in a wash cycle and in a spin cycle wherein:
    (a) during the wash cycle, the controller controls the switch to connect drive circuit to the motor in the wye configuration and the controller controls the motor to drive the laundry receptacle at a wash speed in the range of 400-800 rpms, and (b) during the spin cycle, controller controls the switch to connect the drive circuit to the motor in the delta configuration and the controller controls the motor to drive the laundry receptacle at a spin speed in the range of 12,000-18,000 rpms, wherein said drive circuit having a volt-amp requirement, and wherein the volt-amp requirement of the drive circuit is less than a volt-amp requirement for the drive circuit connected to the motor in the delta configuration during the wash cycle.

13. The washing machine of claim 12 wherein said motor has a current requirement, and wherein the current requirement of the motor is less than a current requirement for the motor connected to the drive circuit in the delta configuration during the wash cycle.

14. The washing machine of claim 12 wherein said drive circuit has a volt-amp requirement, wherein said motor has a current requirement, wherein the volt-amp requirement of the drive circuit is less than a volt-amp requirement for the drive circuit connected to the motor in the delta configuration during the wash cycle, and wherein the current requirement of the motor is less than a current requirement for the motor connected to the drive circuit in the delta configuration during the wash cycle.

* * * * *